(12) United States Patent
Lin

(10) Patent No.: US 7,640,945 B2
(45) Date of Patent: Jan. 5, 2010

(54) ONEWAY VALVE FOR AUTOMATICALLY INFLATABLE AIR CUSHION

(75) Inventor: Ping-Ting Lin, Taichung Hsien (TW)

(73) Assignee: Feng Yi Outdoor Leisure Equipment Enterprise Co., Ltd, Taichung Hsien (TW)

( * ) Notice: Subject to any disclaimer, the term of this patent is extended or adjusted under 35 U.S.C. 154(b) by 339 days.

(21) Appl. No.: 11/649,025

(22) Filed: Jan. 3, 2007

(65) Prior Publication Data

US 2008/0157019 A1 Jul. 3, 2008

(51) Int. Cl.
*F16K 1/12* (2006.01)
*F16K 15/18* (2006.01)

(52) U.S. Cl. .............. 137/269.5; 137/533.21; 137/533.31; 137/854

(58) Field of Classification Search .............. 137/512.1, 137/533.21, 533.31, 854, 223, 234.5, 269.5
See application file for complete search history.

(56) References Cited

U.S. PATENT DOCUMENTS 3,147,763 A * 9/1964 Morton .................... 137/234.5
6,889,707 B2 * 5/2005 Nicolino .................. 137/513.5

* cited by examiner

*Primary Examiner*—Kevin L Lee
(74) *Attorney, Agent, or Firm*—Alan Kamrath; Kamrath & Associates PA

(57) ABSTRACT

A oneway valve for an automatically inflatable air cushion includes a valve body having an air inlet port and an air outlet port, a valve seat mounted in the valve body and formed with a plurality of conducting holes connected to the air inlet port and the air outlet port, and a valve stem movably mounted in the air inlet port and movable to seal the conducting holes. Thus, the oneway valve prevents the air from leaking from the air cushion during the inflation process and prevents the air from entering the air cushion during the deflation process, so that the air cushion is inflated and deflated completely and exactly.

18 Claims, 5 Drawing Sheets

ONEWAY VALVE FOR AUTOMATICALLY INFLATABLE AIR CUSHION

BACKGROUND OF THE INVENTION

1. Field of the Invention

The present invention relates to a oneway valve and, more particularly, to a oneway valve for an automatically inflatable air cushion.

2. Description of the Related Art

A conventional air nozzle for an automatically inflatable air cushion in accordance with the prior art shown in FIG. 7 comprises a mounting seat 30 mounted on an automatically inflatable air cushion 31 containing a packing 311, a connecting pipe 10 having a first end mounted on the mounting seat 30 by ratchet teeth 16 and limit bosses 15, a mediate portion formed with an outer thread 14 and a second end formed with a mounting portion 12 having an inside formed with an annular passage 13 connected to the mounting seat 30, a control cap 20 rotatably mounted on the connecting pipe 10 and having an inside formed with an inner thread 24 screwed onto the outer thread 14 of the connecting pipe 10 and an end face 21 provided with a protruding seal portion 23 that is movable to seal the passage 13 of the connecting pipe 10, and a gasket 11 mounted in the passage 13 of the connecting pipe 10 to press the seal portion 23 of the control cap 20 when the seal portion 23 of the control cap 20 is inserted into the passage 13 of the connecting pipe 10. The connecting pipe 10 has an inside formed with an air chamber 101 connected between the mounting seat 30 and the passage 13. The control cap 20 has an inside formed with an air channel 25 connected to the passage 13 of the connecting pipe 10 when the seal portion 23 of the control cap 20 is detached from the passage 13 of the connecting pipe 10. The end face 21 of the control cap 20 has a peripheral wall formed with a plurality of air vents 22 connected to the air channel 25.

In practice, the inner thread 24 of the control cap 20 is screwed onto the outer thread 14 of the connecting pipe 10, so that when the control cap 20 is rotated relative to the connecting pipe 10, the seal portion 23 of the control cap 20 is movable relative to the passage 13 of the connecting pipe 10. Thus, the seal portion 23 of the control cap 20 is movable to detach from the passage 13 of the connecting pipe 10 to open a connection between the air channel 25 of the control cap 20 and the passage 13 of the connecting pipe 10, so that an air from the ambient environment is in turn introduced through the air vents 22 of the control cap 20, the air channel 25 of the control cap 20, the passage 13 of the connecting pipe 10, the air chamber 101 of the connecting pipe 10 and the mounting seat 30 into the automatically inflatable air cushion 31 so as to inflate the automatically inflatable air cushion 31 automatically. On the contrary, the seal portion 23 of the control cap 20 is movable to seal the passage 13 of the connecting pipe 10 to interrupt the connection between the air channel 25 of the control cap 20 and the passage 13 of the connecting pipe 10, so as to stop the air flow into the automatically inflatable air cushion 31.

However, the user needs to rotate the control cap 20 successively to move the seal portion 23 of the control cap 20 to detach from the passage 13 of the connecting pipe 10 so as to open the air flow or to move the seal portion 23 of the control cap 20 to seal the passage 13 of the connecting pipe 10 so as to close the air flow, thereby causing inconvenience to the user when operating the air nozzle. In addition, after inflation of the automatically inflatable air cushion 31, the user needs to rotate the control cap 20 successively to move the seal portion 23 of the control cap 20 to seal the passage 13 of the connecting pipe 10 to close the air flow, so that the air easily leaks from the automatically inflatable air cushion 31 before the seal portion 23 of the control cap 20 reaches and seals the passage 13 of the connecting pipe 10, thereby decreasing the inflating effect.

BRIEF SUMMARY OF THE INVENTION

In accordance with the present invention, there is provided a oneway valve, comprising a valve body having a first end formed with an air inlet port and a second end formed with an air outlet port, a valve seat mounted in the valve body to separate the air inlet port from the air outlet port of the valve body and formed with a plurality of conducting holes each connected to the air inlet port and the air outlet port of the valve body to connect the air inlet port to the air outlet port of the valve body, and a valve stem movably mounted in the air inlet port of the valve body and movable to seal the conducting holes of the valve seat to interrupt a connection between the air inlet port and the air outlet port of the valve body.

The primary objective of the present invention is to provide a oneway valve that prevents the air from leaking from the automatically inflatable air cushion during the inflation process and prevents the air from entering the automatically inflatable air cushion during the deflation process, so that the automatically inflatable air cushion is inflated and deflated completely and exactly.

Another objective of the present invention is to provide a oneway valve that is locked and unlocked exactly by a pressure differential to prevent the air from flowing back during the inflation and deflation processes, thereby enhancing the inflation and deflation efficiency of the automatically inflatable air cushion.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
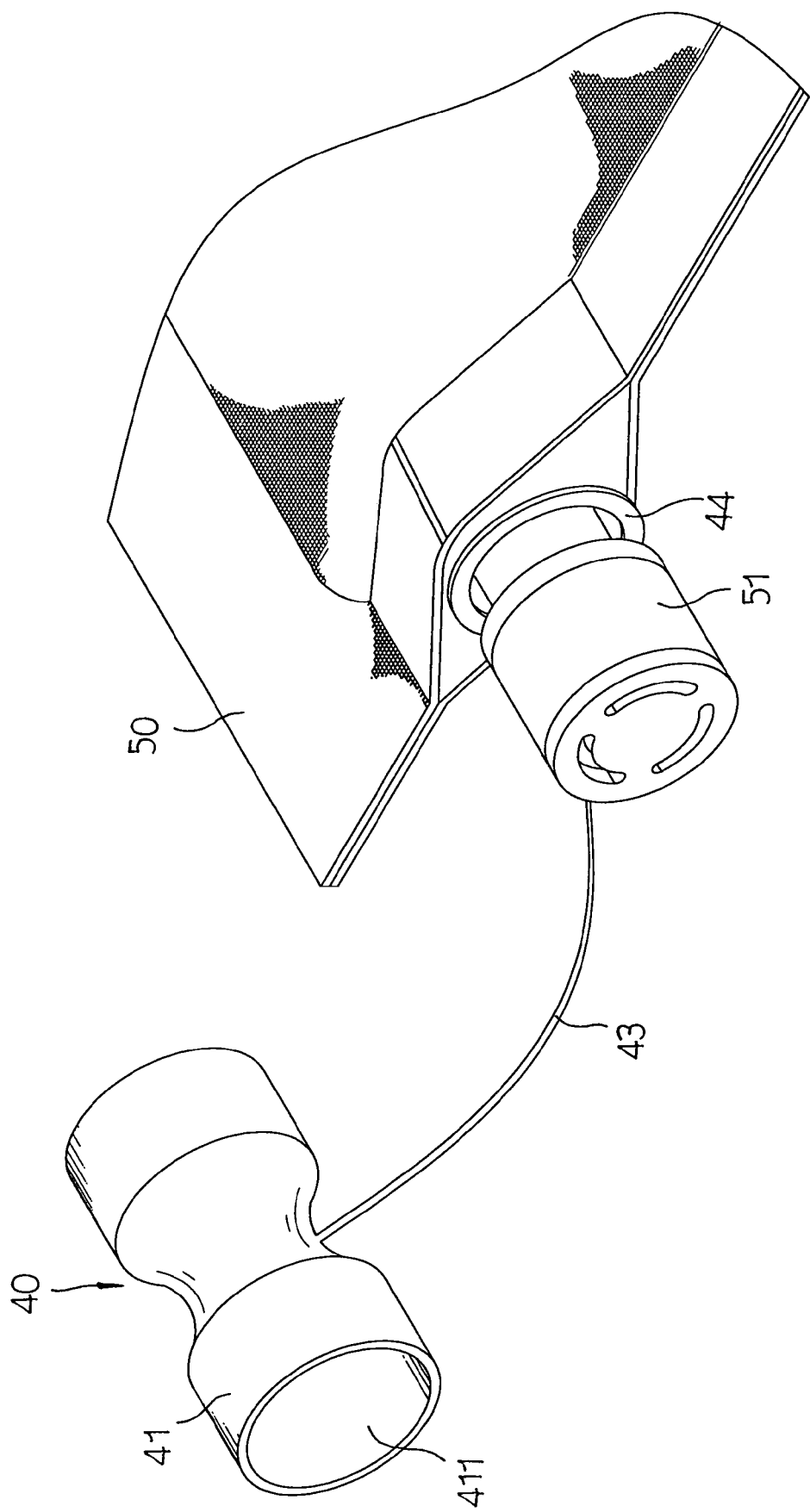
FIG. 1 is a perspective view of a oneway valve for an automatically inflatable air cushion in accordance with the preferred embodiment of the present invention.
Figure 2:
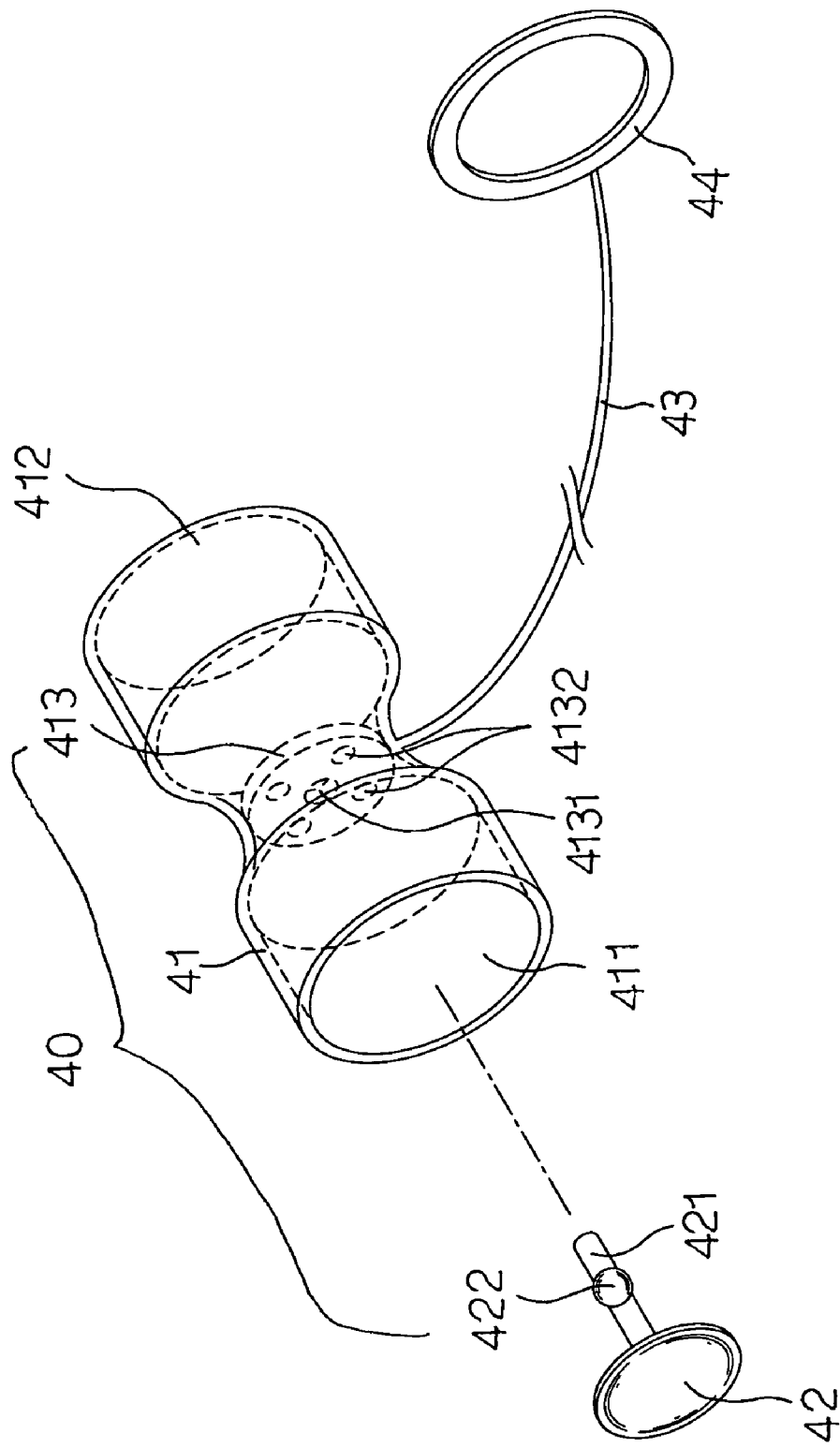
FIG. 2 is an exploded perspective view of the oneway valve as shown in FIG. 1.

Referring to the drawings and initially to FIGS. 1 and 2, a oneway valve 40 in accordance with the preferred embodiment of the present invention comprises a valve body 41 having a first end formed with an air inlet port 411 and a second end formed with an air outlet port 412, a valve seat 413 mounted in the valve body 41 to separate the air inlet port 411 from the air outlet port 412 of the valve body 41 and formed with a plurality of conducting holes 4132 each connected to the air inlet port 411 and the air outlet port 412 of the valve body 41 to connect the air inlet port 411 to the air outlet port 412 of the valve body 41, and a valve stem 42 movably mounted in the air inlet port 411 of the valve body 41 and movable to seal the conducting holes 4132 of the valve seat 413 to interrupt a connection between the air inlet port 411 and the air outlet port 412 of the valve body 41.

The valve body 41 is a hollow body and has a substantially cylindrical shape.

The valve seat 413 is integrally combined with the valve body 41. The valve seat 413 is mounted in a mediate portion of the valve body 41 and located between the air inlet port 411 and the air outlet port 412 of the valve body 41. The valve seat 413 is formed with a through hole 4131 which is located at a central portion of the valve seat 413. The through hole 4131 of the valve seat 413 has a substantially circular shape. The conducting holes 4132 are formed in a peripheral wall of the valve seat 413 and are enclosed around the through hole 4131. The conducting holes 4132 of the valve seat 413 are arranged in an annular manner and are equally spaced from each other.

A piston rod 421 is movably mounted in the through hole 4131 of the valve seat 413 and has a first end secured to the valve stem 42 and a second end formed with a radially and outwardly extending limit boss 422 movable in the air outlet port 412 of the valve body 41. The limit boss 422 of the piston rod 421 is movable to rest on the through hole 4131 of the valve seat 413 to prevent the piston rod 421 from being detached from the through hole 4131 of the valve seat 413. The limit boss 422 of the piston rod 421 has a substantially spherical shape and has a diameter greater than that of the through hole 4131 of the valve seat 413. The piston rod 421 is made of a resilient and flexible material, such as a silicone, plastic or rubber material, so that the limit boss 422 of the piston rod 421 is compressed radially and inwardly to pass through the through hole 4131 of the valve seat 413.

The valve stem 42 has a substantially disk shape and has a diameter greater than that of the through hole 4131 of the valve seat 413. The valve stem 42 is integrally combined with the first end of the piston rod 421.

The oneway valve 40 further comprises a connecting strap 43 made of a flexible material having a first end attached to the valve body 41 and a second end attached to a mounting ring 44. The first end of the connecting strap 43 is attached to the mediate portion of the valve body 41 and located between the air inlet port 411 and the air outlet port 412 of the valve body 41. The mounting ring 44 is mounted on an air nozzle 51 of an automatically inflatable air cushion 50 to attach the oneway valve 40 to the automatically inflatable air cushion 50.

Figure 3:
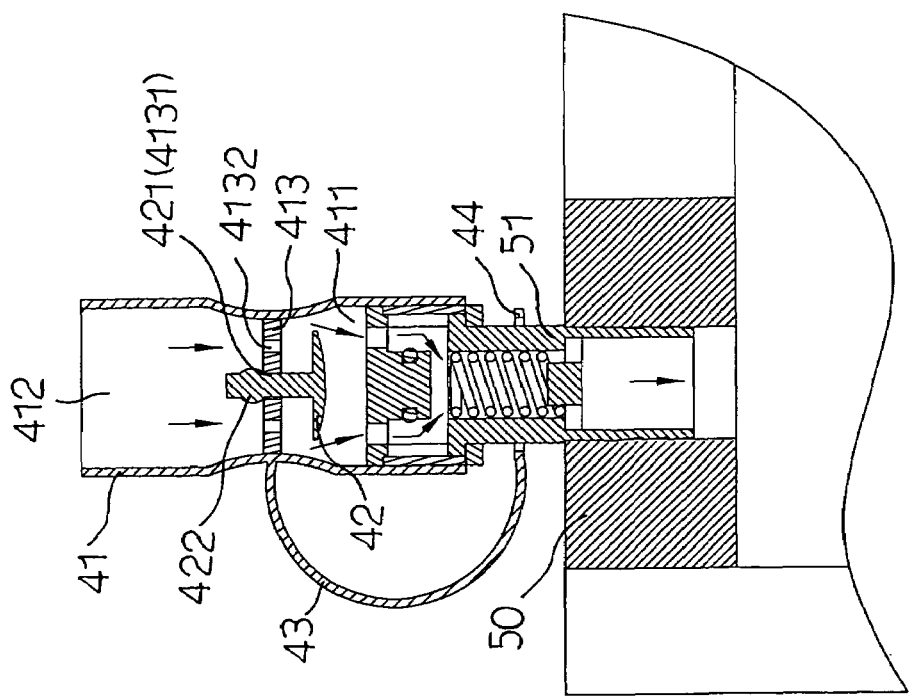
FIG. 3 is a top cross-sectional assembly view of the oneway valve as shown in FIG. 1.

As shown in FIGS. 1-3, the air inlet port 411 of the valve body 41 is mounted on and connected to the air nozzle 51 of the automatically inflatable air cushion 50. Thus, when an air flow is blown through the air outlet port 412 of the valve body 41 and toward the valve seat 413 (or the piston rod 421 is pressed toward the valve seat 413), the valve stem 42 is pushed outwardly relative to the valve seat 413 by the push force of the air flow to detach from the conducting holes 4132 of the valve seat 413 to open the connection between the air inlet port 411 and the air outlet port 412 of the valve body 41, so that the air from the ambient environment is in turn introduced through the air outlet port 412 of the valve body 41, the conducting holes 4132 of the valve seat 413, the air inlet port 411 of the valve body 41 and the air nozzle 51 into the automatically inflatable air cushion 50 as shown in FIG. 3 so as to inflate the automatically inflatable air cushion 70 automatically.

Figure 4:
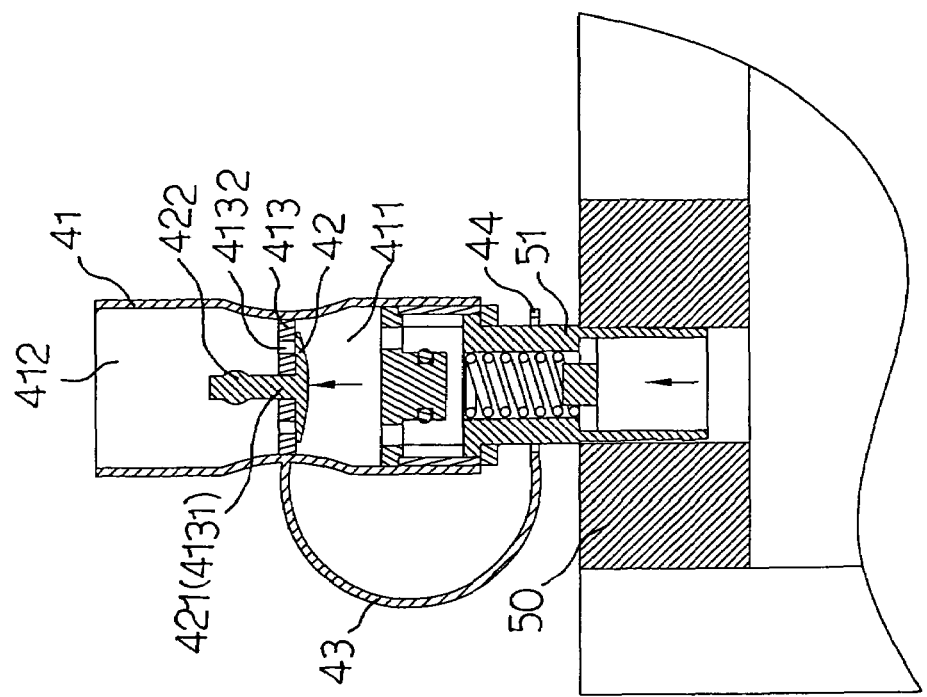
FIG. 4 is a schematic operational view of the oneway valve as shown in FIG. 3.

As shown in FIG. 4, when the pressure in the automatically inflatable air cushion 70 is greater than that of the ambient environment after a full inflation of the automatically inflatable air cushion 70, the valve stem 42 is pushed toward the valve seat 413 by the push force of the air pressure of the automatically inflatable air cushion 70 to seal the conducting holes 4132 of the valve seat 413 to interrupt the connection between the air inlet port 411 and the air outlet port 412 of the valve body 41 so as to lock the oneway valve, thereby preventing the air from leaking from the automatically inflatable air cushion 70, so that the automatically inflatable air cushion 70 is inflated completely and exactly.

Figure 5:
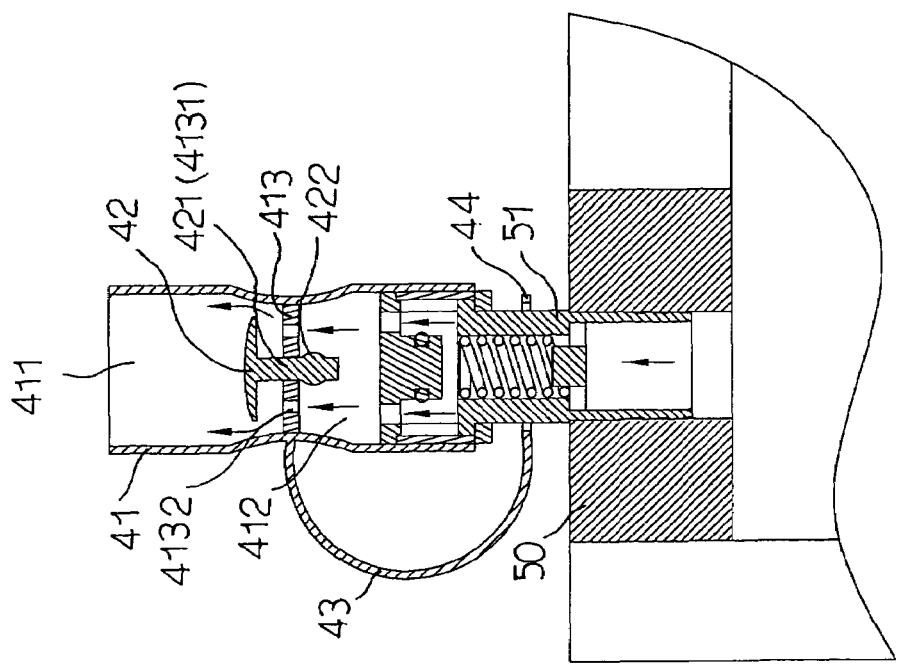
FIG. 5 is a top cross-sectional assembly view of the oneway valve as shown in FIG. 1.
Figure 7:
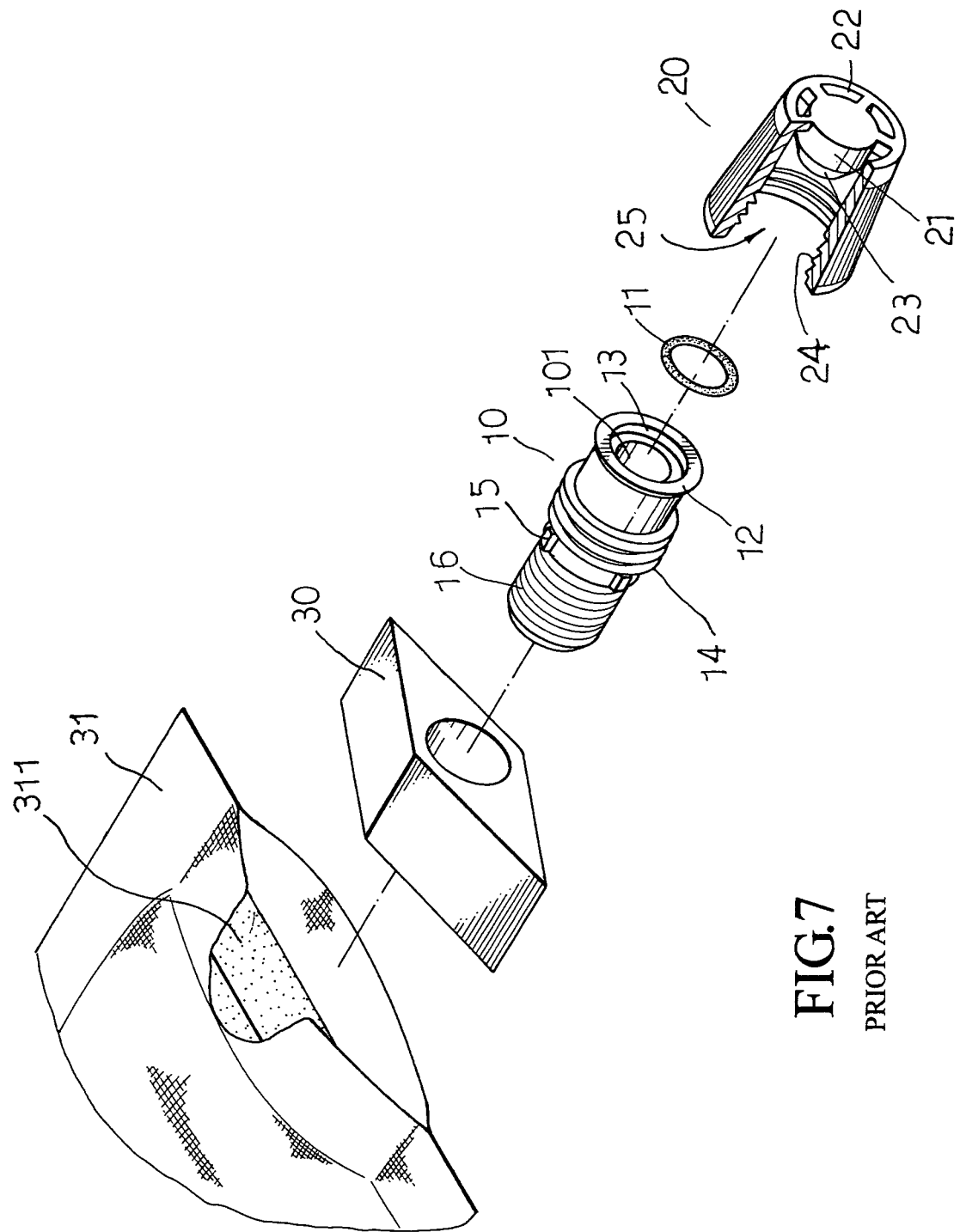
FIG. 7 is an exploded perspective view of a conventional air nozzle for an automatically inflatable air cushion in accordance with the prior art.

As shown in FIG. 5, the air outlet port 412 of the valve body 41 is mounted on and connected to the air nozzle 51 of the automatically inflatable air cushion 50. Thus, when the automatically inflatable air cushion 50 is compressed, the valve stem 42 is pushed outwardly relative to the valve seat 413 by the push force of the air in the automatically inflatable air cushion 50 to detach from the conducting holes 4132 of the valve seat 413 to open the connection between the air inlet port 411 and the air outlet port 412 of the valve body 41, so that the air in the automatically inflatable air cushion 50 is in turn introduced through the air nozzle 51, the air outlet port 412 of the valve body 41, the conducting holes 4132 of the valve seat 413 and the air inlet port 411 of the valve body 41, and is drained outwardly from the air inlet port 411 of the valve body 41 so as to deflate the automatically inflatable air cushion 70.

Figure 6:
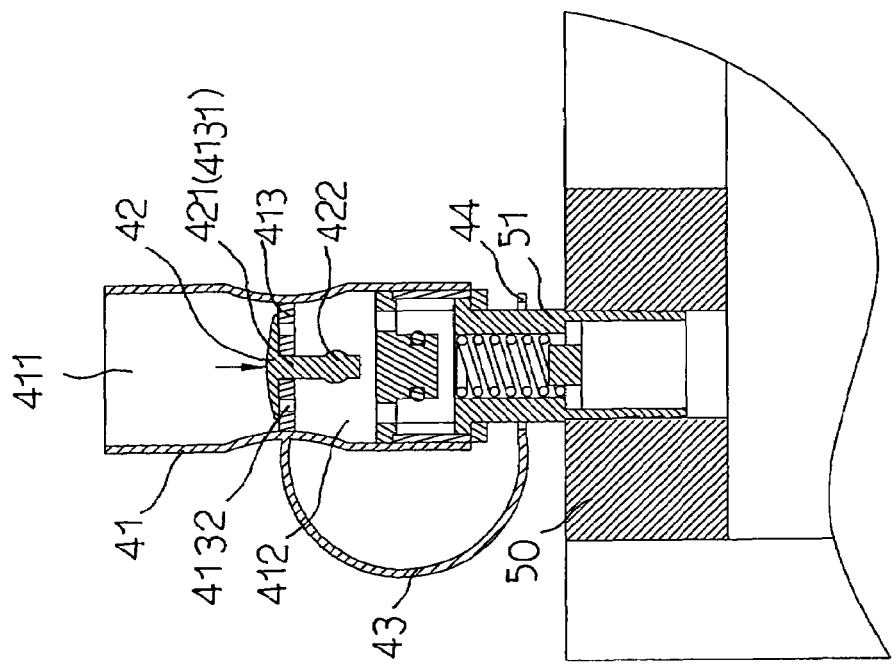
FIG. 6 is a schematic operational view of the oneway valve as shown in FIG. 5.

As shown in FIG. 6, when the pressure in the automatically inflatable air cushion 70 is smaller than that of the ambient environment after a full deflation of the automatically inflatable air cushion 70, the valve stem 42 is pushed toward the valve seat 413 by the push force of the air pressure of the ambient environment to seal the conducting holes 4132 of the valve seat 413 to interrupt the connection between the air inlet port 411 and the air outlet port 412 of the valve body 41 so as to lock the oneway valve, thereby preventing the air from entering the automatically inflatable air cushion 70, so that the automatically inflatable air cushion 70 is deflated completely and exactly.

Accordingly, the oneway valve prevents the air from leaking from the automatically inflatable air cushion 70 during the inflation process and prevents the air from entering the automatically inflatable air cushion 70 during the deflation process, so that the automatically inflatable air cushion 70 is inflated and deflated completely and exactly. In addition, the oneway valve is locked and unlocked exactly by a pressure differential to prevent the air from flowing back during the inflation and deflation processes, thereby enhancing the inflation and deflation efficiency of the automatically inflatable air cushion 70.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A oneway valve, comprising:

a valve body having a first end formed with an air inlet port and a second end formed with an air outlet port;

a valve seat mounted in the valve body to separate the air inlet port from the air outlet port of the valve body and formed with a plurality of conducting holes each connected to the air inlet port and the air outlet port of the valve body to connect the air inlet port to the air outlet port of the vive body;

a valve stem movably mounted in the air inlet port of the valve body and movable to seal the conducting holes of the valve seat to interrupt a connection between the air inlet port and the air outlet port of the valve body;

a connecting strap having a first end attached to the valve body and a second end attached to a mounting ring;

wherein the mounting ring is mounted on an air nozzle of an automatically inflatable air cushion to attach the oneway valve to the automatically inflatable air cushion.

2. The oneway valve in accordance with claim 1, further comprising a piston rod movably mounted on the valve seat and having a first end secured to the valve stem and a second end formed with a radially and outwardly extending limit boss movable in the air outlet port of the valve body.

3. The oneway valve in accordance with claim 2, wherein the valve seat is formed with a through hole, and the piston rod is movably mounted in the through hole of the valve seat.

4. The oneway valve in accordance with claim 3, wherein the limit boss of the piston rod has a diameter greater than that of the through hole of the valve seat.

5. The oneway valve in accordance with claim 3, wherein the through hole of the valve seat has a substantially circular shape, and the limit boss of the piston rod has a substantially spherical shape.

6. The oneway valve in accordance with claim 3, wherein the conducting holes are enclosed around the through hole.

7. The oneway valve in accordance with claim 3, wherein the limit boss of the piston rod is movable to rest on the through hole of the valve seat to prevent the piston rod from being detached from the through hole of the valve seat.

8. The oneway valve in accordance with claim 1, wherein the air inlet port of the valve body is mounted on and connected to the air nozzle of the automatically inflatable air cushion.

9. The oneway valve in accordance with claim 1, wherein the air outlet port of the valve body is mounted on and connected to the air nozzle of the automatically inflatable air cushion.

10. The oneway valve in accordance with claim 1, wherein the valve body is a hollow body and has a substantially cylindrical shape.

11. The oneway valve in accordance with claim 1, wherein the valve seat is integrally combined with the valve body.

12. The oneway valve in accordance with claim 1, wherein the valve seat is mounted in a mediate portion of the valve body and located between the air inlet port and the air outlet port of the valve body.

13. The oneway valve in accordance with claim 3, wherein the through hole of the valve seat is located at a central portion of the valve seat, and the conducting holes are formed in a peripheral wall of the valve seat.

14. The oneway valve in accordance with claim 1, wherein the conducting holes of the valve seat are arranged in an annular manner and are equally spaced from each other.

15. The oneway valve in accordance with claim 2, wherein the piston rod is made of a resilient and flexible material, so that the limit boss of the piston rod is compressed radially and inwardly to pass through the through hole of the valve seat.

16. The oneway valve in accordance with claim 3, wherein the valve stem has a substantially disk shape and has a diameter greater than that of the through hole of the valve seat.

17. The oneway valve in accordance with claim 1, wherein the connecting strap is made of a flexible material.

18. A oneway valve, comprising:

a valve body having a first end formed with an air inlet port and a second end formed with an air outlet port;

a valve seat mounted in the valve body to separate the air inlet port from the air outlet port of the valve body and formed with a plurality of conducting holes each connected to the air inlet port and the air outlet port of the valve body to connect the air inlet port to the air outlet port of the valve body;

a valve stem movably mounted in the air inlet port of the valve body and movable to seal the conducting holes of the valve seat to interrupt a connection between the air inlet port and the air outlet port of the valve body;

a connecting strap having a first end attached to the valve body and a second end attached to a mounting ring;

wherein the first end of the connecting strap is attached to a mediate portion of the valve body and located between the air inlet port and the air outlet port of the valve body.

* * * * *